Patented Nov. 11, 1930

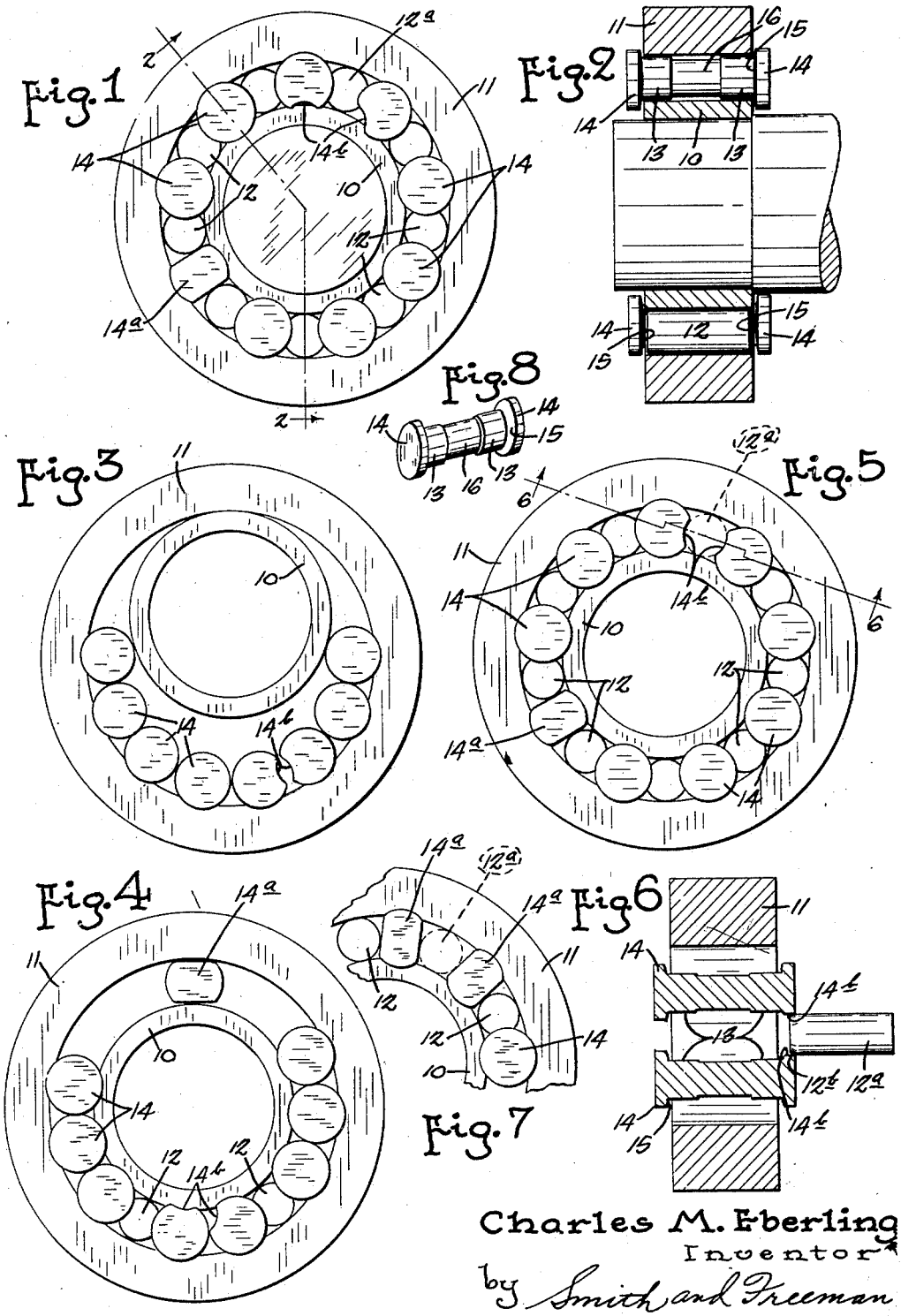

1,781,450

UNITED STATES PATENT OFFICE

CHARLES M. EBERLING, OF CLEVELAND, OHIO

ROLLER BEARING

Application filed March 21, 1928. Serial No. 263,283.

This invention relates to roller bearings and has for its objects the provision of a device of this character of maximum simplicity and longevity combined with cheapness and fewness of parts; the provision of a roller bearing which shall be self-contained and permanently assembled without the presence of screws, bolts, or screw-threaded parts; the provision of a roller bearing whose parts shall have a limited degree of axial movement; the provision of a combined roller and thrust bearing of new and simplified construction; while further objects of the invention will become apparent as the description proceeds.

In the drawings accompanying and forming a part of this application I have shown certain illustrative embodiments of my invention, wherein Fig. 1 is an end elevation of a complete preferred bearing structure, and Fig. 2 a sectional view corresponding to the line 2—2 of Fig. 1; Figs. 3, 4, and 5 illustrate steps in the process of assembling such bearing; Fig. 6 is a sectional view corresponding to the line 6—6 in Fig. 5; Fig. 7 is a detail view of a slightly modified bearing; and Fig. 8 is a perspective view of one spacer.

My improved bearing comprises two coaxial interfitting faces spaced radially apart and receiving between them the cylindrical-bodied elements 12 and 13. These elements are arranged closely side by side around the smaller member in the space between the two members, and alternate elements are formed at both ends with enlarged integral heads 14 which overlap the ends of the intermediate elements and the end faces of the members 10 and 11. Preferably the diameters of the body portions of the elements 12 and 13 are unequal by a few thousandths of an inch, all of the load-carrying elements being of one size (within such tolerance-limit as is customary in bearings) and all the intermediate elements being slightly smaller so as to have a spacing function only. It is my preference that the headed elements have the smaller bodies but this is not imperative, since they can be made larger or all of one size. The inner shoulders of the heads are preferably slightly rounded as indicated at 15 to prevent biting the adjacent parts and the distance between said heads is as much greater than the axial dimension of the members 10 and 11 as the axial looseness desired. I have shown the two members as of equal axial dimension but this is not obligatory, and I have also shown the elements 12 as slightly shorter than this dimension although this also is capable of variation so long as the same fit loosely in the space between the heads 14. Also I have shown the bodies of the element 13 as formed between their ends with reduced portion 16 to afford more space for lubricant, but this is also a variable refinement.

When the bearing is completely assembled the inner member 10 is completely surrounded by elements 12 and 13 in alternation. The mode of assembling requires special consideration. First the member 10 is placed inside the member 11 but eccentrically as shown in Fig. 3 to enable the introduction of the headed elements; this enables free introduction of such elements until 180° of the circumference is completed, which necessarily occurs before all the headed elements have been introduced. As soon as enough such elements have been introduced to subtend 180° the member 10 is moved to a central position as shown in Fig. 4, after which the remaining elements (always at least one and in some cases more than one) are inserted by having one of their heads flattened or partly ground off on opposite sides as shown at 14$^a$. Next the elements 12 are introduced, one between each pair of headed elements, which is easily done by hand until the last such element 12$^a$ is reached, which is forced into place between two headed elements whose heads are notched, flattened, or ground away for the purpose as shown at 14$^b$ in Figs. 1 to 6, or at 14$^a$ in Fig. 7. In other words the notching to prevent the insertion of the plain roller can either be independent of the flattening to permit the insertion of the last headed roller or it can be combined therewith. The last element 12$^a$ is preferably tapered slightly at its entering end as shown at 12$^b$ in Fig. 6, and if pressed into place by machine produces a bearing which cannot be dismantled. Such tightness of fit is, however, not necessary since the form of bearing shown in Fig. 7 even when made so loose as to enable dismantling with the fingers, has been run successfully for many months without difficulty since the constant rotation of the headed elements prevents any lengthwise movement of any element. Preferably the heads are round except those two or three where flattening or notching is necessary for purposes of assembling, but it is within the limits of complete operativeness and high utility to make them all flattened or notched and hence within the intent of these my Letters Patent.

My improved bearing is devoid of intricate surfaces or small parts and the parts exhibit a maximum simplicity. It is especially applicable to clutches, line shafts, and other bearings where because of mechanical requirement or temperature changes a certain amount of lengthwise play is necessary. Because of its cheapness, ruggedness, and simplicity it is also of peculiar value in connection with agricultural machinery, railway rolling stock, heavy machinery, mining, coal and concrete machinery, and many other places where the demands of ruggedness, simplicity, and flexibility are paramount. It serves even as a thrust bearing to some extent especially when the majority of the heads are made of circular contour.

Of course the members 10 and 11 may take any desired external shape and be attached to any kind of machine and I do not limit myself in any wise except as specifically recited in my several claims which I desire may be construed broadly, each independently of limitations contained in other claims.

Having thus described my invention what I claim is:

1. In a roller bearing, the combination with two coaxial members having spaced cylindrical surfaces on their interior and exterior, respectively, of a plurality of plain cylindrical rollers interposed between said surfaces and a plurality of headed rollers between adjacent rollers, said headed rollers being formed integral at each end with integral heads overlapping the adjacent portions of said members and rollers and at least two of said spacers having some part of their heads now circular.

2. In a roller bearing, a pair of coaxial cylindrical surfaced members of unequal size located one inside the other, and a plurality of cylindrical elements arranged closely side by side around the smaller member in the space between said cylindrical surfaces, alternate elements having enlarged integral heads at both ends which overlap both the intermediate elements and the adjacent end faces of the members, and at least one of said heads being flattened at the sides to enable it to pass between said surfaces.

3. In a roller bearing, a pair of coaxial cylindrical surfaced members of unequal size located one inside the other, and a plurality of cylindrical elements arranged closely side by side around the smaller member in the space between said cylindrical surfaces, each of said elements being made of a single piece of metal and certain of said elements having enlarged heads at both ends which overlap both the intermediate elements and the end faces of said members, one at least of said heads having a reduced side adapted to permit the introduction of the adjacent element during assembling, and the axial length of at least one of said members between its end faces being less than that between the heads of a headed element to permit endwise looseness.

In testimony whereof I hereunto affix my signature.

CHARLES M. EBERLING.

CERTIFICATE OF CORRECTION.

Patent No. 1,781,450. Granted November 11, 1930, to

CHARLES M. EBERLING.

It is hereby certified that error appears in the printed specification of the above numbered patent requiring correction as follows: Page 2, lines 51 and 52, claim 1, for the words "now circular" read non-circular; and that the said Letters Patent should be read with this correction therein that the same may conform to the record of the case in the Patent Office.

Signed and sealed this 3rd day of March, A. D. 1931.

(Seal)

M. J. Moore,
Acting Commissioner of Patents.